US012321011B2

(12) United States Patent
Puckett et al.

(10) Patent No.: US 12,321,011 B2
(45) Date of Patent: Jun. 3, 2025

(54) TURNING GRATING DEVICE FOR EMISSION OF ARBITRARY OPTICAL BEAM PROFILES FROM WAVEGUIDES INTO TWO-DIMENSIONAL SPACE

(71) Applicant: Honeywell International Inc., Charlotte, NC (US)

(72) Inventors: Matthew Wade Puckett, Phoenix, AZ (US); Karl D. Nelson, Plymouth, MN (US); Chad Fertig, Bloomington, MN (US); Chad Hoyt, Roseville, MN (US); Neil A. Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 867 days.

(21) Appl. No.: 17/531,072

(22) Filed: Nov. 19, 2021

(65) Prior Publication Data
US 2024/0402425 A1 Dec. 5, 2024

Related U.S. Application Data

(60) Provisional application No. 63/140,172, filed on Jan. 21, 2021.

(51) Int. Cl.
*G02B 6/124* (2006.01)
*G02B 6/12* (2006.01)
*G02B 6/34* (2006.01)

(52) U.S. Cl.
CPC ............... *G02B 6/124* (2013.01); *G02B 6/34* (2013.01); *G02B 2006/12107* (2013.01)

(58) Field of Classification Search
CPC . G02B 6/34; G02B 6/124; G02B 2006/12107
See application file for complete search history.

(56) References Cited

U.S. PATENT DOCUMENTS 5,226,100 A 7/1993 Maerz
7,454,103 B2 11/2008 Parriaux
(Continued)

FOREIGN PATENT DOCUMENTS

CN 108776367 A 11/2018

OTHER PUBLICATIONS

Kim et al., "Photonic waveguide to free-space Gaussian beam extreme mode converter", Light; Science and Applications, 7:72, 2018, pp. 1 through 13, Official journal of the CIOMP.
(Continued)

*Primary Examiner* — Michael P Mooney
(74) *Attorney, Agent, or Firm* — Fogg & Powers LLC (57) ABSTRACT

A turning grating coupler device comprises a waveguide core layer including a grating structure and an output slab adjoined with the grating structure. The grating structure comprises an array of sub-waveguides substantially parallel to each other along a first propagation direction. Each of the sub-waveguides has opposing sidewalls, and a width of each sub-waveguide is defined by a distance between the sidewalls. The width of each sub-waveguide is varied such that each of the sidewalls has a periodic structure that produces a sidewall periodic modulation that is out of phase with respective sidewall periodic modulations of adjacent neighboring sub-waveguides. An input edge is configured to receive a light beam from a source and direct the beam into the array of sub-waveguides in the first propagation direction. The sub-waveguides are configured to diffract the beam into the output slab in a second propagation direction substantially perpendicular to the first propagation direction.

16 Claims, 5 Drawing Sheets

(56) References Cited

U.S. PATENT DOCUMENTS

| | | |
|---|---|---|
| 9,354,362 B2 | 5/2016 | Li et al. |
| 11,215,760 B2 * | 1/2022 | Puckett .............. G02B 6/12011 |
| 2005/0254752 A1 | 11/2005 | Domash et al. |
| 2014/0363127 A1 | 12/2014 | Baets et al. |
| 2016/0238787 A1 | 8/2016 | Nadovich |
| 2017/0138789 A1 | 5/2017 | Ivanov |

OTHER PUBLICATIONS

Yulaev et al., "Metasurface-Integrated Photonic Platform for Versatile Free-Space Beam Projection with Polarization Control", ACS Photonics, Sep. 18, 2019, pp. 1 through 8, American Chemical Society.

Puckett, Matthew W. et al., "Device for Emission of Arbitrary Optical Beam Profiles From a Chip To Free Space", U.S. Appl. No. 16/800,877, filed Feb. 25, 2020, pp. 1 through 33, Published: US.

Puckett, Matthew W. et al., "Device for the Emission of Arbitrary Optical Beam Profiles From Waveguides Into Two-Dimensional Space", U.S. Appl. No. 16/803,712, filed Feb. 27, 2020, pp. 1 through 20, Published: US.

* cited by examiner

TURNING GRATING DEVICE FOR EMISSION OF ARBITRARY OPTICAL BEAM PROFILES FROM WAVEGUIDES INTO TWO-DIMENSIONAL SPACE

CROSS REFERENCE TO RELATED APPLICATION

This application claims the benefit of and priority to U.S. Provisional Application No. 63/140,172, filed on Jan. 21, 2021, which is herein incorporated by reference.

STATEMENT REGARDING FEDERALLY SPONSORED RESEARCH OR DEVELOPMENT

This invention was made with Government support under HR0011-16-C-0122 awarded by DARPA ACES. The Government has certain rights in the invention.

BACKGROUND

In integrated photonics it is often necessary to transition the spatial dimensions of a light wave from a highly confined waveguide state to a more broadly spatially distributed state compatible with free-space optics. An important field in which this functionality is desirable is the generation of free-space beams, derived from integrated photonics waveguides, for magneto-optic traps (MOTs).

The most straightforward way to couple an integrated photonics waveguide mode into a wide slab mode is to direct a waveguide into a slab and allow the light to diverge naturally. There are, however, various shortcomings which are intrinsic to this approach. For instance, a significant amount of propagation will be required to allow the light beam to diverge to any required size, and this can take up valuable real estate on the surface of the integrated photonics chip. Additionally, only a Gaussian profile may be realized in this manner, whereas a uniform intensity distribution is often more desirable. Further, the beam which this approach generates is diverging, whereas collimated beam is often more desirable.

SUMMARY

A turning grating coupler device comprises a waveguide core layer that includes a grating structure and an output slab that adjoins with the grating structure. The grating structure includes an input edge, and an output edge that is substantially perpendicular to the input edge. The output slab adjoins with the grating structure such that the optical slab is in optical communication with the output edge of the grating structure. The grating structure comprises an array of sub-waveguides that are substantially parallel to each other along a first propagation direction. Each of the sub-waveguides has opposing sidewalls, and a width of each sub-waveguide is defined by a distance between the opposing sidewalls. The width of each sub-waveguide is varied such that each of the opposing sidewalls has a periodic structure that produces a sidewall periodic modulation that is out of phase with respective sidewall periodic modulations of adjacent neighboring sub-waveguides. The input edge of the grating structure is configured to receive a light beam from a light source and direct the light beam into the array of sub-waveguides in the first propagation direction. The sub-waveguides are configured to diffract the light beam into the output slab in a second propagation direction that is substantially perpendicular to the first propagation direction.

BRIEF DESCRIPTION OF THE DRAWINGS

Features of the present disclosure will be apparent to those skilled in the art from the following description with reference to the drawings. Understanding that the drawings depict only typical embodiments and are not therefore to be considered limiting in scope, the embodiments will be described with additional specificity and detail through the use of the drawings, in which.

DETAILED DESCRIPTION

In the following detailed description, reference is made to the accompanying drawings, in which is shown by way of illustration various exemplary embodiments. It is to be understood that other embodiments may be utilized. The following detailed description is, therefore, not to be taken in a limiting sense.

Optical devices for the emission of arbitrary optical beam profiles from waveguides into two-dimensional space are described herein. The optical devices provide an improved design for a turning grating coupler, which is more readily capable of generating wider two-dimensional waves by merit of an improved mode of apodization of the grating structure's strength of diffraction. These optical devices can be used to generate a wide two-dimensional wave from an integrated photonics waveguide, for example.

The present approach solves the problems described above by introducing a grating into a waveguide, and positioning a slab to the side of the grating. Light propagating along the waveguide can be made to diffract off the grating and into the slab at about a 90 degree angle, and the grating strength can be modified by changing the width of the grating structure within the waveguide. Using a grating structure with a spatially dependent width allows for generating a beam propagating in the slab to the side of the waveguide, with any desired intensity distribution. The light beam in the slab does not require any propagation length, and the beam is collimated, rather than diverging, making the beam more easily interfaced with out-of-plane grating couplers. In the present devices, substantially all of the light is diffracted from the waveguide mode into the slab mode.

In the present turning grating couplers, the grating includes an array of sub-waveguides running parallel to an input waveguide, and to obtain diffraction, the width of each of the sub-waveguides in the array is periodically modulated. To reduce the grating strength, the modulation amplitude for each of the sub-waveguides is reduced, which allows for the grating strength to be taken to virtually a value of $0\ m^{-1}$ without compromising the efficiency.

The turning grating coupler devices can be made by fabricating a waveguide core layer on an integrated photonics chip through any number of established fabrication processes. In the design of a first lithography mask, a waveguide is directed into one edge of a large slab. After applying this first lithography mask to a first round of lithography and etching, a second lithography mask is applied, and in this mask, a grating is partially etched into the waveguide, and also the slab it etched. This will result in a grating structure that couples light gradually into the slab, at about 90 degrees from its original direction of propagation, and at a controllable rate.

Further details of various embodiments are described hereafter with reference to the drawings.

Figure 1A:
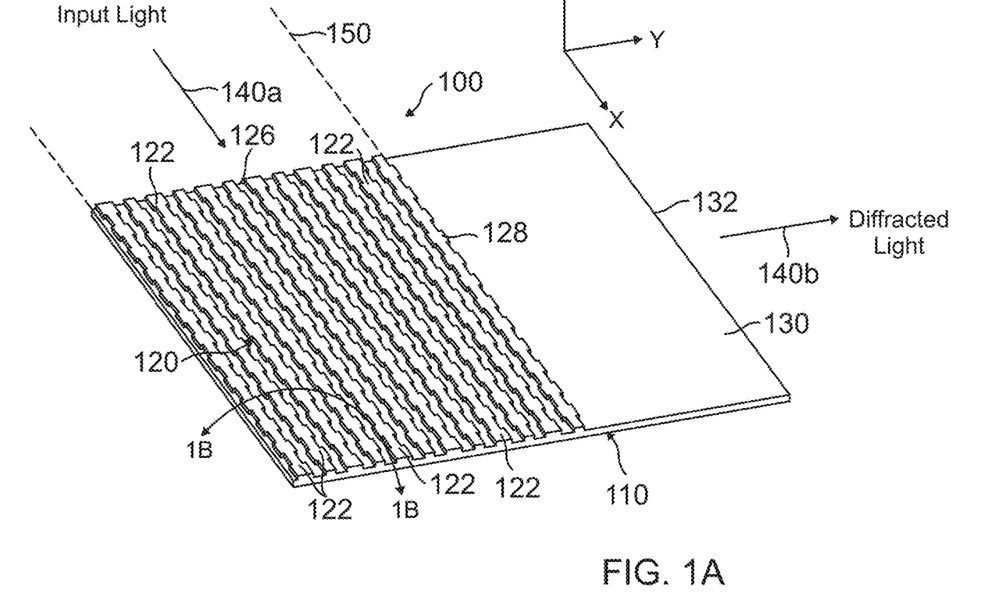
FIG. 1A is a schematic orthogonal view of a turning grating coupler device, according to one embodiment.
Figure 1B:
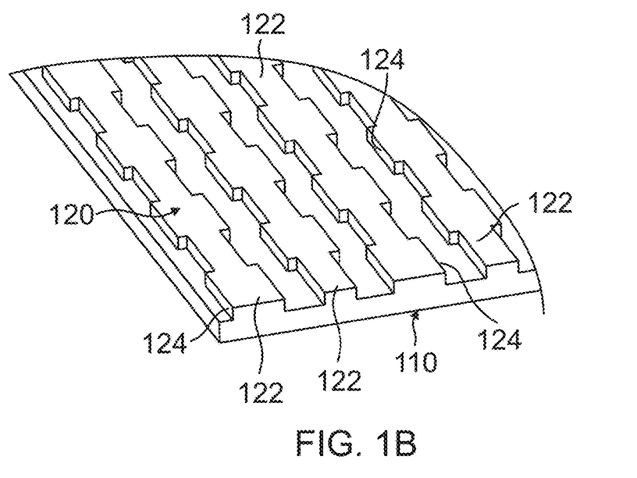
FIG. 1B is an enlarged orthogonal view of a section of the turning grating coupler device of FIG. 1A.

FIGS. 1A and 1B schematically illustrate a turning grating coupler 100, according to one embodiment. The turning grating coupler 100 includes a waveguide core layer 110, which has a grating structure 120 on a first portion, and an output slab 130 on a second portion of core layer 110. The output slab 130 adjoins with grating structure 120, such that output slab 130 is in optical communication with one side of grating structure 120.

The grating structure 120 is written on the first portion of core layer 110 using standard microfabrication techniques, as described further hereafter. The grating structure 120 includes a copropagating array of sub-waveguides 122 that run substantially parallel to each other. The sub-waveguides 122 extend in a direction substantially parallel to a propagation direction of an input light beam 140a. As shown more clearly in FIG. 1B, each of sub-waveguides 122 has opposing sidewalls 124.

A width of each of sub-waveguides 122 is defined by a distance between opposing sidewalls 124, which is varied such that sidewalls 124 each have a periodic structure that produces a sidewall periodic modulation for each of sub-waveguides 122. Thus, each sub-waveguide 122 has a periodic change in width along a propagation direction based on the periodic structure of their opposing sidewalls, such that each sub-waveguide 122 is individually modulated by the periodic change in the width. Additionally, the sidewall periodic modulation of each of sub-waveguides 122 is out of phase (offset) with the sidewall periodic modulation of adjacent (neighboring) sub-waveguides 122. This phase offset can be changed by adjusting the amplitude of the sidewall periodic modulations between adjacent sub-waveguides 122.

The sub-waveguides 122 are closely spaced to each other, such that the pitch between sub-waveguides 122 is at a sub-wavelength distance (i.e., smaller than an operating light wavelength). This creates an effective operating medium for grating structure 120. In various embodiments, the sub-wavelength distance between sub-waveguides 122 can be about 150 nm to about 500 nm. The sub-waveguides 122 each have a uniform size, so as to have the same maximum and minimum widths (modulation). As adjacent sub-waveguides 122 are out of phase with each other, this creates effective diagonal grating lines across grating structure 120 (formed from the wider portions of adjacent sub-waveguides).

The grating structure 120 is formed to have a first thickness, and output slab 130 is formed to have a second thickness that is less than the first thickness. In various embodiments, grating structure 120 can have a thickness of about 30 nm to about 300 nm (e.g., 150 nm), and output slab 130 can have a thickness of about 25 nm to about 250 nm (e.g., 130 nm).

The grating structure 120 has a grating input edge 126 configured to receive input light beam 140a from an input waveguide 150, for example (FIG. 1A). The grating structure 120 has a grating output edge 128 that adjoins with output slab 130. The array of sub-waveguides 122 supports a guided mode in grating structure 120, so light beam 140a does not leak into output slab 130, but only diffracts into output slab 130. The phase offset of the sidewall periodic modulations between neighboring sub-waveguides 122 is what gives grating structure 120 its component of the grating k-vector that causes light beam 140a to turn from grating structure 120 into output slab 130.

To operate turning grating coupler 100, input light beam 140a is injected from an optical source through input waveguide 150 and into grating structure 120 at input edge 126 (along x-axis). The light beam 140a is diffracted by grating structure 120 into output slab 130 at about a 90 degree angle (along y-axis) with respect to sub-waveguides 122 of grating structure 120. A diffracted light beam 140b, which is collimated, is then output from output slab 130 at a slab output side 132.

The turning grating coupler 100 can be designed such that the strength of diffraction of grating structure 120 is controllable. For example, turning grating coupler 100 can be designed such that when light beam 140a propagates through grating structure 120 from input edge 126, the strength of diffraction increases in order for the apodization to give a uniform beam that is diffracted into output slab 130.

The amplitude of the sidewall periodic modulations can be increased in various grating designs, so that the grating strength is increased. The grating strength with respect to amplitude can be characterized when the apodization is done for the grating structure. In addition, the grating strength can be reduced smoothly down to zero without changing the k-vector of the grating structure (as the k-vector stays constant). This provides the benefit of reducing the grating strength (by decreasing the amplitude) while keeping the grating efficiency high.

Figure 2:
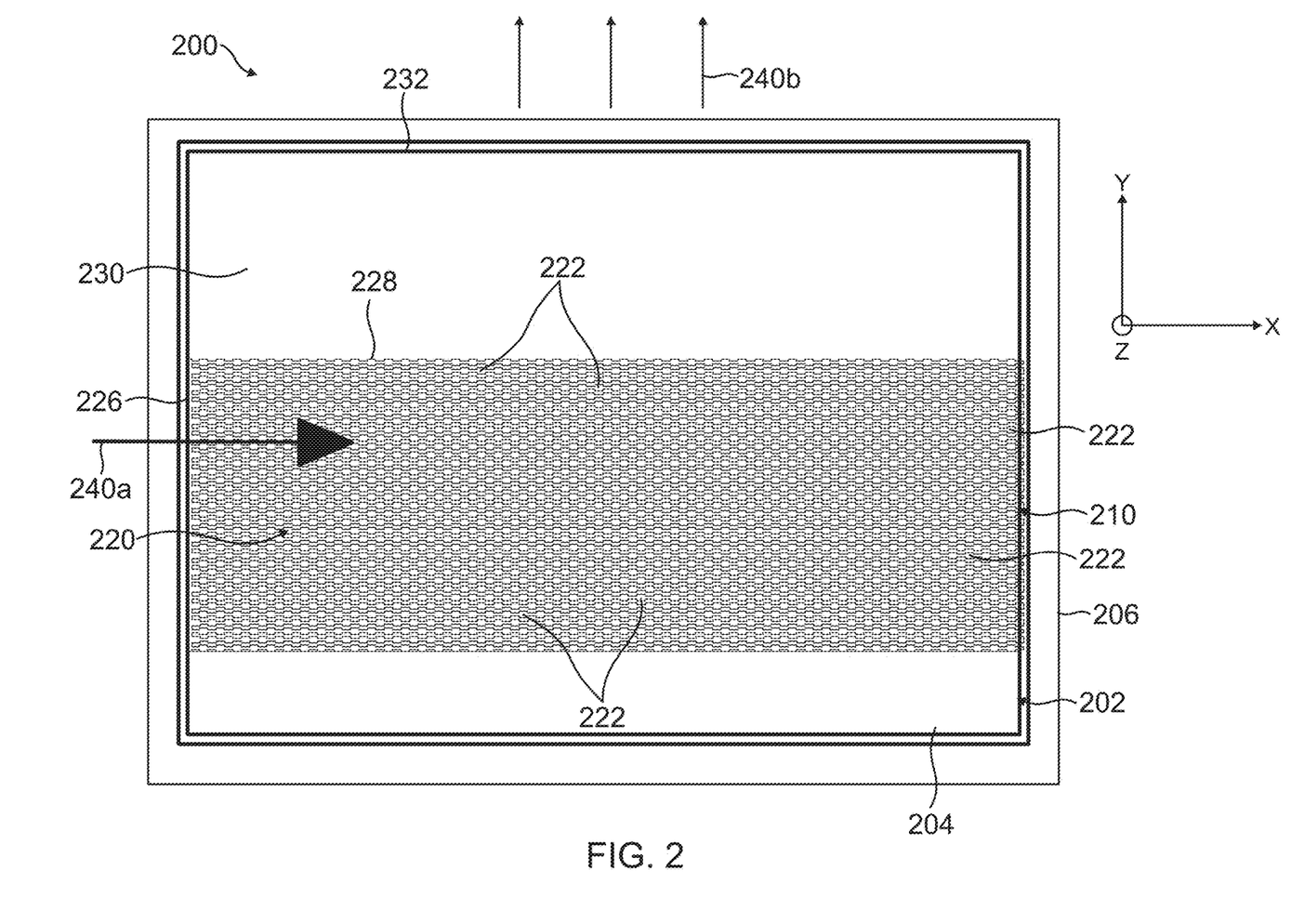
FIG. 2 is a schematic top plan view of a turning grating coupler device, according to another embodiment.

FIG. 2 is a schematic top view of a turning grating coupler device 200, according to another embodiment. The turning grating coupler device 200 includes a substrate 202 having an upper surface 204, and a waveguide core layer 210 on upper surface 204.

The substrate 202 can be a cladding layer composed of a first material having a first (lower) refractive index, such as silicon dioxide ($SiO_2$), aluminum oxide ($Al_2O_3$), magnesium oxide (MgO), potassium chloride (KCl), combinations thereof, or the like. The substrate 202 can be formed on an integrated photonics chip 206, such as a silicon photonics chip, for example.

The waveguide core layer 210 includes a grating structure 220 on a first portion, and an output slab 230 on a second portion of core layer 210. The output slab 230 adjoins with grating structure 220, such that output slab 230 is in optical communication with one side of grating structure 220. The waveguide core layer 210 is composed of a second (higher) refractive index material, such as silicon nitride ($Si_3N_4$), silicon (Si), titanium dioxide ($TiO_2$), gallium arsenide (GaAs), gallium nitride (GaN), combinations thereof, or the like.

The grating structure 220 is written on the first portion of core layer 210 using standard microfabrication techniques. The grating structure 220 includes a copropagating array of sub-waveguides 222 that run substantially parallel to each other. The sub-waveguides 222 extend in a direction substantially parallel to a propagation direction of an input light beam 240a. Each of sub-waveguides 222 has opposing sidewalls, and a width of each waveguide 222 is defined by a distance between the opposing sidewalls, which is varied such that the sidewalls each have a periodic structure that produces a sidewall periodic modulation for each sub-waveguide 222. Thus, each sub-waveguide 222 has a periodic change in width along a propagation direction based on the periodic structure of their opposing sidewalls, such that each sub-waveguide 222 is individually modulated by the periodic change in the width.

Additionally, the sidewall periodic modulation of each of sub-waveguides 222 is out of phase (offset) with the sidewall periodic modulation of adjacent (neighboring) sub-waveguides 222. This phase offset can be changed by adjusting the amplitude of the sidewall periodic modulations between adjacent sub-waveguides 222. The sub-waveguides 222 are closely spaced to each other, such that the pitch between sub-waveguides 222 is at a sub-wavelength distance.

The grating structure 220 has a grating input side 226 configured to receive input light beam 240a from an input waveguide. The grating structure 220 has a grating output side 228 that adjoins with output slab 230. The period of the sidewall periodic modulations sets the grating k-vector in the left-to-right direction for grating structure 220 (as viewed in FIG. 2), and the phase offset of the neighboring sidewall periodic modulations sets the k-vector in a transverse direction toward output slab 230.

To operate turning grating coupler device 200, input light beam 240a is injected from an optical source into grating structure 220 at input side 226 (along x-axis). The light beam 240a is diffracted by grating structure 220 into output slab 230 at about a 90 degree angle (along y-axis) with respect to sub-waveguides 222 of grating structure 220. A diffracted light beam 240b, which is collimated, is then output from output slab 230 at a slab output side 232. The grating structure 220 and output slab 230 are substantially planar with respect to each other, such that input light beam 240a and diffracted light beam 240b propagate in substantially the same plane.

Figure 3A:
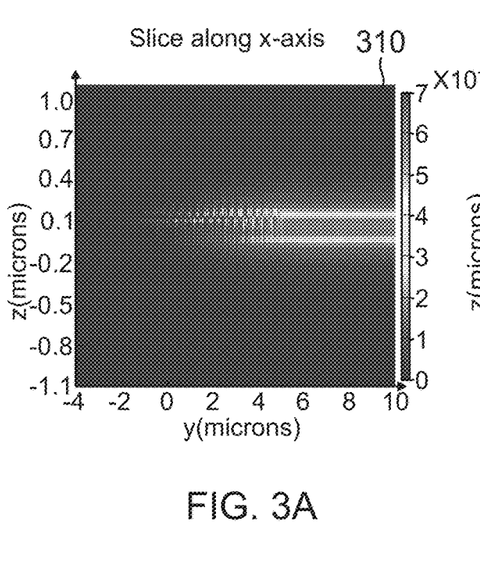
FIGS. 3A, 3B, and 3C depict theoretical simulations of respective axial views of grating strength as a function of grating width within a turning grating coupler device.
Figure 3B:
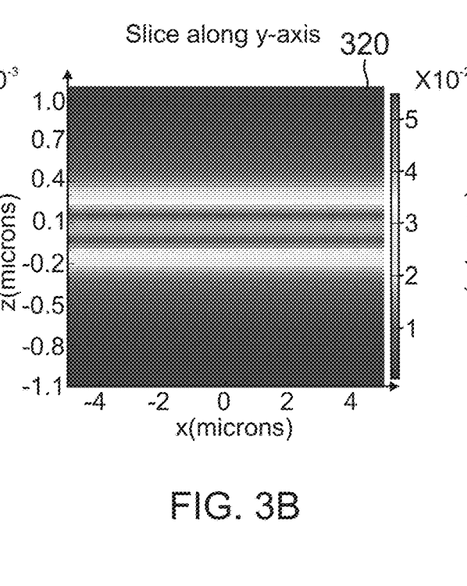
Figure 3C:
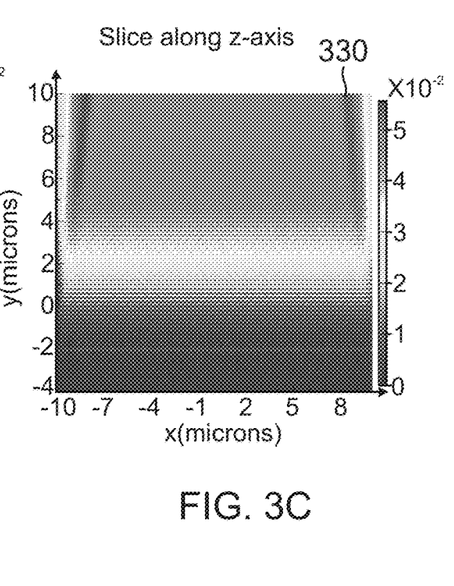

FIGS. 3A-3C depict theoretical simulations of respective axial views of grating strength as a function of grating width during operation of a turning grating coupler, such as shown in FIG. 2. FIG. 3A shows a first slice 310 viewed along the x-axis (showing y-z plane), FIG. 3B shows a second slice 320 viewed along the y-axis (showing x-z plane), and FIG. 3C shows a third slice 330 viewed along the z-axis (showing x-y plane). In FIGS. 3A-3C, the input light is sent into the grating as transverse electric (TE) polarized light in the x-y plane, and the diffracted light is converted to a transverse magnetic (TM) polarized light. However, in FIGS. 3A-3C, only the TM polarized light is depicted.

In FIG. 3A, the input light is shown propagating out of the page in the grating, but the diffracted light is propagating in in the positive y-direction into the slab. In FIG. 3B, which shows a view along the slab, the diffracted light is propagating through the slab out of the page. After the input light is diffracted, an excited single mode propagates in the slab as a vertically polarized slab mode (e.g., TM mode). In FIG. 3C, the TM mode polarized light is shown as a function of position. As shown, the TM mode polarized light is being generated within the grating and then emitted into the slab.

Figure 4:
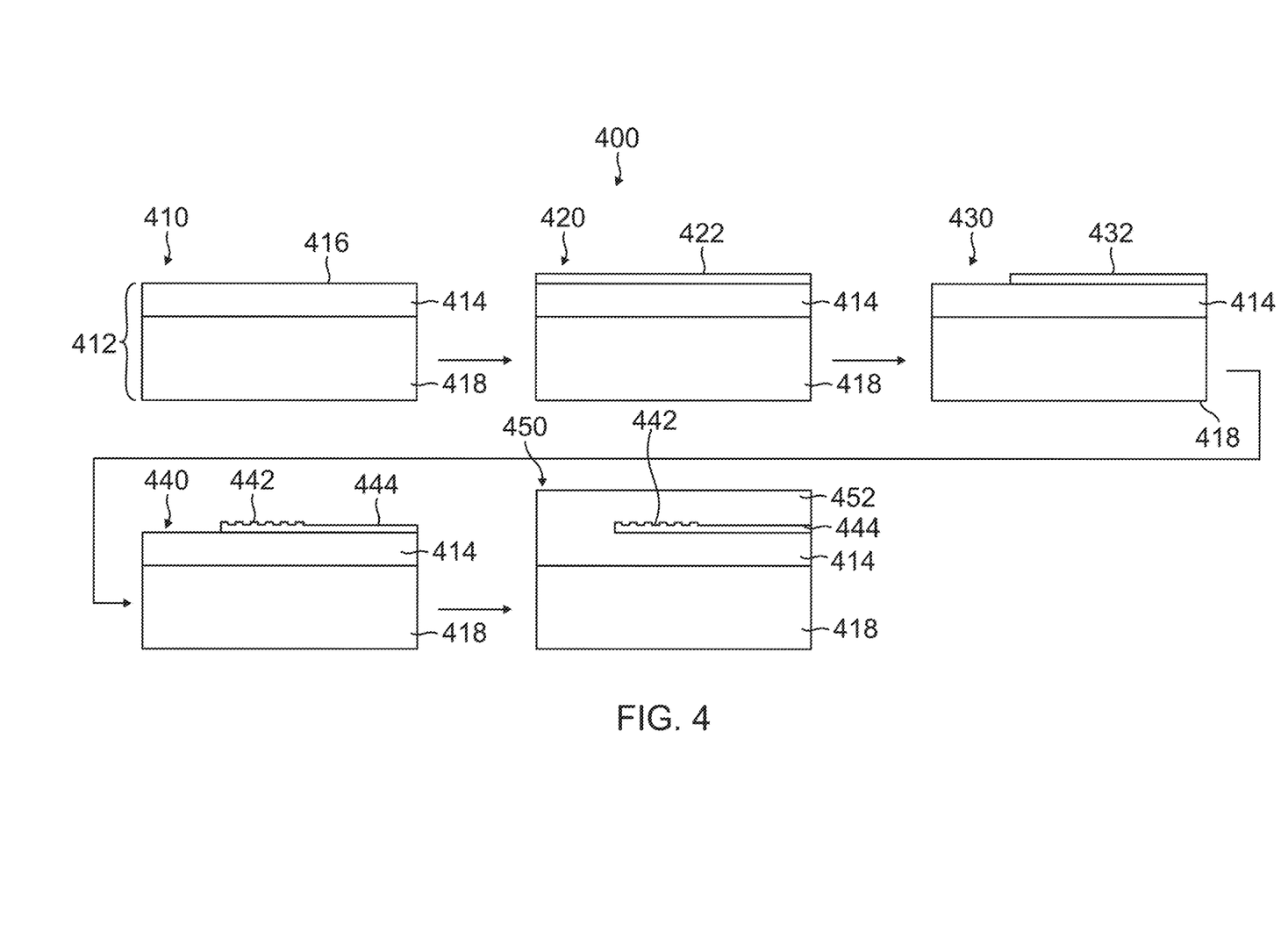
FIG. 4 shows schematic side views of a method for fabricating a turning grating coupler device, according to an exemplary approach.

FIG. 4 illustrates schematic side views of a method 400 for fabricating a turning grating coupler device, such as those described above, according to one exemplary approach. Initially, as shown at 410, a substrate 412 is provided, such as an initial wafer, which includes a bottom cladding layer 414 with an upper surface 416. The bottom cladding layer 414 includes a first material having a first (lower) refractive index, such as silicon dioxide or the like. The substrate 412 can also include an underlying handle wafer 418, such as a silicon handle, which supports bottom cladding layer 414. The substrate 412 can be coupled to a photonics chip.

As depicted at 420, a core layer 422 is deposited on upper surface 416 of cladding layer 414, such as by a conventional deposition process. The core layer 422 includes a second material having a second (higher) refractive index that is greater than the first refractive index of the first material. For example, the second material can include silicon nitride or the like.

Next, as shown at 430, a waveguide layer 432 is formed from core layer 422. The waveguide layer 432 can be formed through standard lithography, etching, and resist removal steps. Thereafter, as depicted at 440, a grating structure 442 and an output slab 444 are formed from waveguide layer 432, such as through additional lithography, etching, and resist removal steps, which forms the turning grating coupler device.

Optionally, as shown at 450, a top cladding layer 452 can be formed over grating structure 442, output slab 444, and exposed portions of bottom cladding layer 414, such as by a conventional deposition process, to further protect the turning grating coupler device. The top cladding layer 452 can again include the first material having a lower refractive index.

Figure 5:
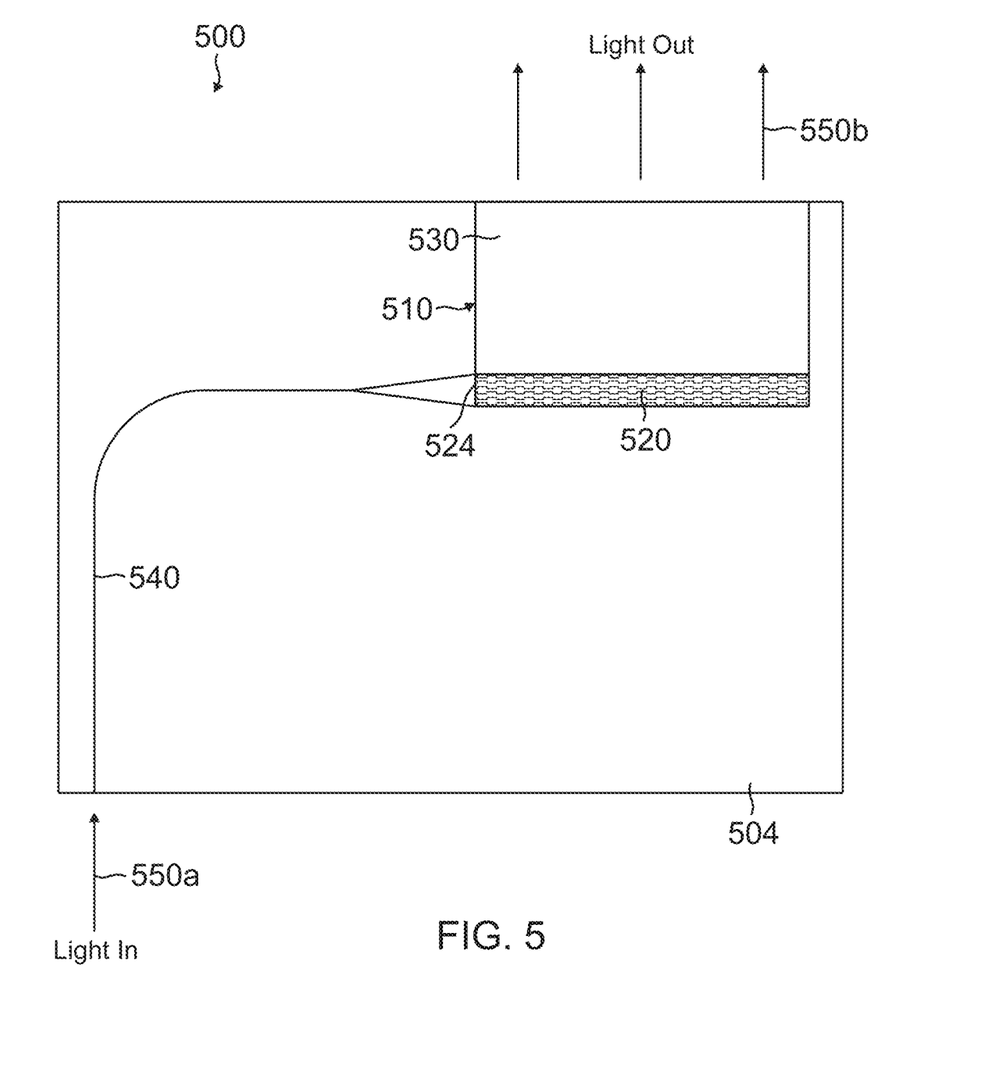
FIG. 5 is a schematic top plan view of an exemplary chip layout, which includes a turning grating coupler device.

FIG. 5 illustrates an exemplary chip layout 500, which includes an integrated photonics chip 504, and a turning grating coupler device 510 such as those described previously, formed on photonics chip 504. The turning grating coupler device 510 includes a grating structure 520, and an output slab 530 that adjoins one side of grating structure 520. The grating structure 520 comprises a copropagating array of sub-waveguides such as described previously herein. The grating structure 520 and output slab 530 can be embedded in a cladding layer, such as those described previously.

An input waveguide 540 on photonics chip 504 is optically coupled to a grating input edge 524 of grating structure 520. The input waveguide 540 is configured to receive a light beam 550a from a light source and direct light beam 550a to input edge 524 of grating structure 520. The light beam 550a diffracted by grating structure 520 into output slab 530 such that a light beam 550b, which is collimated, is output from optical slab 530 in a direction substantially perpendicular to the propagation direction of the light beam in grating structure 520.

EXAMPLE EMBODIMENTS

Example 1 includes a turning grating coupler device, comprising: a waveguide core layer, comprising; a grating structure including an input edge, and an output edge that is substantially perpendicular to the input edge, the grating structure comprising: an array of sub-waveguides that are substantially parallel to each other along a first propagation direction, wherein each of the sub-waveguides has opposing sidewalls, and a width of each sub-waveguide is defined by a distance between the opposing sidewalls; wherein the width of each sub-waveguide is varied such that each of the opposing sidewalls has a periodic structure that produces a sidewall periodic modulation that is out of phase with respective sidewall periodic modulations of adjacent neighboring sub-waveguides; and an output slab that adjoins the grating structure such that the optical slab is in optical communication with the output edge of the grating structure;

wherein the input edge of the grating structure is configured to receive a light beam from a light source and direct the light beam into the array of sub-waveguides in the first propagation direction, the sub-waveguides configured to diffract the light beam into the output slab in a second propagation direction that is substantially perpendicular to the first propagation direction.

Example 2 includes the turning grating coupler device of Example 1, wherein the waveguide core layer is substantially planar such that the grating structure and the output slab are substantially planar with respect to each other.

Example 3 includes the turning grating coupler device of any of Examples 1-2, wherein the grating structure and the output slab are configured such that the light beam propagates in the grating structure and diffracts into the optical slab along substantially the same plane.

Example 4 includes the turning grating coupler device of any of Examples 1-3, wherein the diffracted light beam is output from the output slab as a collimated beam.

Example 5 includes the turning grating coupler device of Example 1, wherein the grating structure has a first thickness, and the output slab has a second thickness that is less than the first thickness.

Example 6 includes the turning grating coupler device of any of Examples 1-5, wherein the sub-waveguides are spaced apart from each other so that a pitch between neighboring sub-waveguides has a distance that is at a sub-wavelength of the input light beam.

Example 7 includes the turning grating coupler device of any of Examples 1-6, wherein each of the sub-waveguides has a periodic change in the width along the first propagation direction based on the periodic structure of the opposing sidewalls, such that each sub-waveguide is individually modulated by the periodic change in the width.

Example 8 includes the turning grating coupler device of any of Examples 1-7, wherein the sub-waveguides are uniformly sized with respect to each other so that their sidewall periodic modulations are substantially the same.

Example 9 includes the turning grating coupler device of any of Examples 1-8, further comprising: a substrate that supports the waveguide core layer including the grating structure and the output slab.

Example 10 includes the turning grating coupler device of Example 9, wherein: the substrate comprises a bottom cladding layer that includes a first material having a first refractive index; and the waveguide core layer includes a second material having a second refractive index that is greater than the first refractive index.

Example 11 includes the turning grating coupler device of Example 10, wherein the first material comprises silicon dioxide, aluminum oxide, magnesium oxide, potassium chloride, or combinations thereof.

Example 12 includes the turning grating coupler device of any of Examples 10-11, wherein the second material comprises silicon nitride, silicon, titanium dioxide, gallium arsenide, gallium nitride, or combinations thereof.

Example 13 includes the turning grating coupler device of any of Examples 10-12, further comprising: a top cladding layer over the grating structure and the output slab, the top cladding layer including the first material having the first refractive index.

Example 14 includes the turning grating coupler device of any of Examples 9-13, wherein the substrate is coupled to an integrated photonics chip.

Example 15 includes a method of fabricating a turning grating coupler device, the method comprising: forming a substrate layer comprising a bottom cladding layer that includes a first material having a first refractive index; depositing a core layer over the bottom cladding layer, the core layer including a second material having a second refractive index that is greater than the first refractive index; forming a waveguide layer from the core layer; and forming a grating structure and an output slab from the waveguide layer; wherein the grating structure is formed with an array of sub-waveguides that are substantially parallel to each other along a first propagation direction, wherein each of the sub-waveguides is formed with opposing sidewalls, and a width of each sub-waveguide is defined by a distance between the opposing sidewalls, wherein the width of each sub-waveguide is varied such that each of the opposing sidewalls has a periodic structure that produces a sidewall periodic modulation that is out of phase with respective sidewall periodic modulations of adjacent neighboring sub-waveguides; wherein the output slab is formed so as to adjoin with the grating structure such that the optical slab is in optical communication with the grating structure.

Example 16 includes the method of Example 15, further comprising: forming a top cladding layer over the grating structure and the output slab, the top cladding layer including the first material having the first refractive index.

Example 17 includes the method of any of Examples 15-16, wherein the first material comprises silicon dioxide, and the second material comprises silicon nitride.

Example 18 includes the method of any of Examples 15-17, wherein the substrate layer is formed on an integrated photonics chip.

Example 19 includes an optical device, comprising: an integrated photonics chip; an input waveguide on the photonics chip; and a turning grating coupler on the photonics chip and optically coupled to the input waveguide, the turning grating coupler including a waveguide core layer that comprises: a grating structure comprising an array of sub-waveguides that are substantially parallel to each other along a first propagation direction, wherein each of the sub-waveguides has opposing sidewalls, and a width of each sub-waveguide is defined by a distance between the opposing sidewalls, wherein the width of each sub-waveguide is varied such that each of the opposing sidewalls has a periodic structure that produces a sidewall periodic modulation that is out of phase with respective sidewall periodic modulations of adjacent neighboring sub-waveguides; and an output slab that adjoins with the grating structure such that the optical slab is in optical communication with the grating structure; wherein the input waveguide is configured to receive a light beam from a light source and direct the light beam into the grating structure in the first propagation direction, wherein the sub-waveguides are configured to diffract the light beam into the output slab in a second propagation direction that is substantially perpendicular to the first propagation direction.

Example 20 includes the optical device of Example 19, wherein the grating structure and the output slab are embedded in a cladding layer.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A turning grating coupler device, comprising:
   a waveguide core layer, comprising;

a grating structure including an input edge, and an output edge that is substantially perpendicular to the input edge, the grating structure comprising:
an array of sub-waveguides that are substantially parallel to each other along a first propagation direction, wherein each of the sub-waveguides has opposing sidewalls, and a width of each sub-waveguide is defined by a distance between the opposing sidewalls;
wherein the width of each sub-waveguide is varied such that each of the opposing sidewalls has a periodic structure that produces a sidewall periodic modulation that is out of phase with respective sidewall periodic modulations of adjacent neighboring sub-waveguides; and
an output slab that adjoins with the grating structure such that the optical slab is in optical communication with the output edge of the grating structure;
wherein the input edge of the grating structure is configured to receive a light beam from a light source and direct the light beam into the array of sub-waveguides in the first propagation direction, the sub-waveguides configured to diffract the light beam into the output slab in a second propagation direction that is substantially perpendicular to the first propagation direction.

2. The turning grating coupler device of claim 1, wherein the waveguide core layer is substantially planar such that the grating structure and the output slab are substantially planar with respect to each other.

3. The turning grating coupler device of claim 1, wherein the grating structure and the output slab are configured such that the light beam propagates in the grating structure and diffracts into the optical slab along substantially the same plane.

4. The turning grating coupler device of claim 1, wherein the diffracted light beam is output from the output slab as a collimated beam.

5. The turning grating coupler device of claim 1, wherein the grating structure has a first thickness, and the output slab has a second thickness that is less than the first thickness.

6. The turning grating coupler device of claim 1, wherein the sub-waveguides are spaced apart from each other so that a pitch between neighboring sub-waveguides has a distance that is at a sub-wavelength of the input light beam.

7. The turning grating coupler device of claim 1, wherein each of the sub-waveguides has a periodic change in the width along the first propagation direction based on the periodic structure of the opposing sidewalls, such that each sub-waveguide is individually modulated by the periodic change in the width.

8. The turning grating coupler device of claim 1, wherein the sub-waveguides are uniformly sized with respect to each other so that their sidewall periodic modulations are substantially the same.

9. The turning grating coupler device of claim 1, further comprising:
a substrate that supports the waveguide core layer including the grating structure and the output slab.

10. The turning grating coupler device of claim 9, wherein:
the substrate comprises a bottom cladding layer that includes a first material having a first refractive index; and
the waveguide core layer includes a second material having a second refractive index that is greater than the first refractive index.

11. The turning grating coupler device of claim 10, wherein the first material comprises silicon dioxide, aluminum oxide, magnesium oxide, potassium chloride, or combinations thereof.

12. The turning grating coupler device of claim 10, wherein the second material comprises silicon nitride, silicon, titanium dioxide, gallium arsenide, gallium nitride, or combinations thereof.

13. The turning grating coupler device of claim 10, further comprising:
a top cladding layer over the grating structure and the output slab, the top cladding layer including the first material having the first refractive index.

14. The turning grating coupler device of claim 9, wherein the substrate is coupled to an integrated photonics chip.

15. An optical device, comprising:
an integrated photonics chip;
an input waveguide on the photonics chip; and
a turning grating coupler on the photonics chip and optically coupled to the input waveguide, the turning grating coupler including a waveguide core layer that comprises:
a grating structure comprising an array of sub-waveguides that are substantially parallel to each other along a first propagation direction, wherein each of the sub-waveguides has opposing sidewalls, and a width of each sub-waveguide is defined by a distance between the opposing sidewalls, wherein the width of each sub-waveguide is varied such that each of the opposing sidewalls has a periodic structure that produces a sidewall periodic modulation that is out of phase with respective sidewall periodic modulations of adjacent neighboring sub-waveguides; and
an output slab that adjoins with the grating structure such that the optical slab is in optical communication with the grating structure;
wherein the input waveguide is configured to receive a light beam from a light source and direct the light beam into the grating structure in the first propagation direction, wherein the sub-waveguides are configured to diffract the light beam into the output slab in a second propagation direction that is substantially perpendicular to the first propagation direction.

16. The optical device of claim 15, wherein the grating structure and the output slab are embedded in a cladding layer.

* * * * *